United States Patent
Aoyama

(10) Patent No.: US 7,256,782 B2
(45) Date of Patent: Aug. 14, 2007

(54) METHOD, APPARATUS AND PROGRAM FOR COMPOSITING IMAGES, AND METHOD, APPARATUS AND PROGRAM FOR RENDERING THREE-DIMENSIONAL MODEL

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 10/826,917

(22) Filed: Apr. 16, 2004

(65) Prior Publication Data
US 2005/0007385 A1 Jan. 13, 2005

(30) Foreign Application Priority Data
Apr. 17, 2003 (JP) ............... 2003-113202

(51) Int. Cl.
*G06T 15/50* (2006.01)
*G09G 5/00* (2006.01)
(52) U.S. Cl. ...................... 345/426; 345/632
(58) Field of Classification Search ............... 345/419, 345/426, 632
See application file for complete search history.

(56) References Cited

U.S. PATENT DOCUMENTS

| | | | | |
|---|---|---|---|---|
| 4,970,666 A * | 11/1990 | Welsh et al. | ................. | 345/423 |
| 5,594,850 A * | 1/1997 | Noyama et al. | ............ | 345/632 |
| 6,028,606 A * | 2/2000 | Kolb et al. | .................. | 345/419 |
| 6,166,744 A * | 12/2000 | Jaszlics et al. | .............. | 345/629 |
| 6,268,863 B1* | 7/2001 | Rioux | ........................ | 345/427 |
| 7,027,642 B2* | 4/2006 | Rubbert et al. | ............. | 382/154 |
| 7,068,825 B2* | 6/2006 | Rubbert et al. | ............. | 382/128 |

FOREIGN PATENT DOCUMENTS

| | | |
|---|---|---|
| JP | 01-196672 | 8/1989 |
| JP | 2000-207576 | 1/2000 |

OTHER PUBLICATIONS

Ned Greene, Paul S. Heckbert, "Creating raster Omnimax Images from Multiple Perspective Views Using the Elliptical Weighted Average Filter," Jun. 1986, IEEE Computer Graphics and Applications, v.6 n.6, p. 21-27.*

(Continued)

*Primary Examiner*—Ulka J. Chauhan
*Assistant Examiner*—Jason M Repko
(74) *Attorney, Agent, or Firm*—Carrier, Blackman + Associates, P.C.; Joseph P. Carrier; William D. Blackman

(57) ABSTRACT

A three-dimensional (3D) model OB, a plane of projection PL, a light source L and a reference viewpoint O are defined in a virtual space on a computer. When a line of sight LC for tracing from the reference viewpoint O to the 3D model OB and to the light source L is determined, the view point is corrected to be shifted from the reference viewpoint O by a displacement $V_D$ for each projection pixel PP, to obtain a proper line of sight LC. Accordingly, a computer-graphics image as thus rendered can be provided to be composited with a picture taken from life by a camera, thereby generating a composite image having a natural impression.

11 Claims, 9 Drawing Sheets

OTHER PUBLICATIONS

F. S. Hill, Jr. "Computer Graphics Using OpenGL," May 15, 2000, 2nd Edition, Prentice Hall.*

Nathan A. Carr, Jesse D. Hall, John C. Hart, "The Ray Engine," Sep. 1, 2002, Proceedings of the ACM SIGGRAPH/EUROGRAPHICS Conference on Graphics Hardware.*

Benjamin Mora, Jean Pierre Jessel René Caubet, "A New Object-Order Ray-Casting Algorithm," Oct. 27, 2002, Proceedings of the Conference on Visualization '02.*

Nelson Max, "Computer Graphics Distortion for IMAX and OMNIMAX Projection," Dec. 1983, Procedings of NICOGRAPH '83, p. 137-159.*

Craig Kolb, Don Mitchell, Pat Hanrahan, "A Realistic Camera Model for Computer Graphics," Aug. 1995, SIGGRAPH 1995 Conference Proceedings, p. 317-324.*

Geregly Vass, Tamás Perlaki, "Applying and Removing Lens Distortion in Post Production," May 2003, Proceedings of the Second Hungarian Conference on Computer Graphics and Geometry 2003.*

* cited by examiner

FIG.3

| COORDINATES | | DISPLACEMENT $V_D$ | | | DIRECTION VECTOR $V_C$ | | |
|---|---|---|---|---|---|---|---|
| x | y | dx | dy | dz | Cx | Cy | Cz |
| 0 | 0 | 0.01 | 0.05 | -0.01 | 0.0151 | 0.85 | 0.012 |
| 1 | 0 | 0.009 | 0.05 | -0.01 | 0.0149 | 0.85 | 0.012 |
| 3 | 0 | 0.009 | 0.05 | -0.01 | 0.0147 | 0.85 | 0.012 |
| . | . | . | . | . | . | . | . |
| . | . | . | . | . | . | . | . |
| . | . | . | . | . | . | . | . |
| 768 | 0 | . | . | . | . | . | . |
| 0 | 1 | . | . | . | . | . | . |
| 1 | 1 | . | . | . | . | . | . |
| . | . | . | . | . | . | . | . |

METHOD, APPARATUS AND PROGRAM FOR COMPOSITING IMAGES, AND METHOD, APPARATUS AND PROGRAM FOR RENDERING THREE-DIMENSIONAL MODEL

BACKGROUND OF THE INVENTION

1. Field of the Invention

This invention relates to a method, apparatus and program for compositing images, particularly a computer-graphic image and a picture taken by a camera, and a method, apparatus and program for rendering a three-dimensional model created by computer graphics into a two-dimensional image to be superposed on a picture taken by a camera to form a composite image.

2. Discussion of Background Art

Two-dimensional representation (for on-screen presentation or the like) of a three-dimensional object modeled utilizing a computer (hereinafter referred to as "3D model") is created by a "rendering" process. Among conventional methods for rendering a 3D model (i.e., generating a two-dimensional image therefrom) is ray tracing, which is disclosed for example in Japanese Laid-Open Patent Application, Publication No. 2000-207576 A. The ray tracing is, as shown in FIG. 5, a method in which a 3D model 101 created in a virtual space on a computer is converted into a two-dimensional image assuming that the object represented by the 3D model 101 is viewed from a specific viewpoint 103. To be more specific, a plane of projection 102 is defined in a specific position of the virtual space on a side of the viewpoint 103 facing toward a direction in which the 3D model 101 can be seen from the viewpoint 103, for example, between the viewpoint 103 and the 3D model 101; in addition, a light source 104 is set at an appropriate place in the virtual space. In the plane of projection 102 are defined pixels 105 such as those arranged on a screen; a separate light ray 106 for each pixel 105, which is transmitted from the pixel 105 to the viewpoint 103, is traced backward from the viewpoint 103 through the pixel 105 to its origin (3D model 101), or through the 3D model 101 to the pixel 105, so that a color (attributes thereof) of a corresponding portion of the 3D model is assigned to the color of the pixel 105. This operation is performed for every pixel 105, to eventually project the 3D model 101 two-dimensionally on the plane of projection 102.

Performance improvements of computers in recent years have enabled operation of compositing a picture (typically as a digitized image) taken from life by a camera with an image formed using computer graphics or CG such as characters, packaged goods, etc., and have thus encouraged new visual expression particularly in making movies and TV programs.

In order to create a composite image in a manner as described above, a 3D model is generated in the virtual space on a computer at the outset. Next, the 3D model is rendered by ray tracing to generate a two-dimensional image. In the process of ray tracing, the view point, plane of projection and pixels thereon are defined in such a manner as to simulate picture-taking conditions of a real-world camera, such as a shooting angle (tilt angle, etc.) and angle of view, in which the camera has taken a picture for use in forming a composite image. The two-dimensional image formed on the plane of projection through the process of ray tracing is superposed on the picture (film or digital image) taken by the camera, thereby forming the composite image.

The above-described method for compositing images is however based upon the premise that the camera used to take the picture would have operated on the principle of a pinhole camera (i.e., according to "pinhole camera model"). Therefore, a minute amount of displacement occurs when the image (picture) taken by the camera and the CG image rendered in accordance with the pinhole camera model are superposed.

The difference between an image according to the pinhole camera model having no lens and an image (picture) taken by a real-world camera having lens systems will be described hereinbelow.

According to the pinhole camera model, as shown in FIG. 6, rays of light traveling through a base position (pinhole H) alone strike on an image plane, so that visible aspects of a three-dimensional space are mapped into a two-dimensional space on the image plane. In other words, the pinhole camera model is premised on one imaginary pinhole through which rays of incident light travel and strike on the image plane to form an image thereon. In contrast, the real-world camera having lens systems, unlike the pinhole camera, is not adapted to produce rays of incident light to one point of convergence. Thus, an image taken by the camera having lens systems contains nonlinear distortion, which is greater in peripheral areas.

On the other hand, the process of tracing each ray of light backward from one fixed viewpoint upon rendering a 3D model utilizing ray tracing is analogous with the process of taking the picture of a 3D object using a pinhole camera. Accordingly, rays of light, as computed by ray tracing, each strike on the image plane in a direction subtly different from that in which the corresponding ray of light incident on the image plane in the real-world camera would travel.

Consequently, according to the above conventional method of compositing images, a CG image created as described above appears slightly displaced relative to an image of the picture taken from life by the camera. Such displacements, if brought into a still image or frozen frame, possibly could not appear so obtrusive as to annoy a viewing person, but if brought into each image (frame) of a moving video picture, would slightly shake the CG image, producing an unnatural impression.

Assume, for example, that a scene from the driver's seat of an automobile is shot by a camera so that the camera takes pictures of the instrument panel and views seen through the windshield. The pictures taken by the camera are then combined with a CG image of an array of various gauges and accessories to be arranged on the instrument panel. In a case where the camera pans to record a scene, the CG image of gauges, etc. would disadvantageously shake relative to the instrument panel during the scene in a sequence of the resultant composite images made by the aforementioned conventional method, though the CG image should move together with the instrument panel, without changing the relative positions thereof.

This phenomenon becomes nonnegligible when the object distance in the pictures taken by the camera varies broadly from a long range to a close range and the distance of the 3D object from the viewpoint for creating CG images is small. Against this backdrop, the conventional method of compositing images as described above requires an extra manual operation of correcting the position of the CG image relative to the pictures on which the CG image is superposed.

Accordingly, there is an increasing demand to provide a method, apparatus and program for compositing images, and a method, apparatus and program for rendering a three-dimensional model, in which errors derived from the pinhole camera model utilized in rendering a 3D object to be combined with a picture taken from life by a camera can be removed to obtain a natural composite image.

SUMMARY OF THE INVENTION

In one exemplary aspect of the present invention, there is provided a method for compositing a computer-graphics (CG) image and a picture taken by a camera. The method includes: (1) defining a three-dimensional (3D) model, a viewpoint, and a plane of projection, in a space established on a computer; (2) defining lines of sight extending from the viewpoint to projection pixels on the plane of projection so that each of the lines of sight conforms with a ray of light incident on a pixel corresponding thereto of the picture taken by the camera; (3) tracing the lines of sight extending from the viewpoint through the plane of projection and the 3D model to obtain attributes of portions of the 3D model corresponding to the projection pixels, thereby forming a two-dimensional (2D) image of the 3D model on the plane of projection; and (4) superposing the 2D image on the picture to generate a composite image.

As recited above, the present invention employs the "ray tracing" in which a 3D model in a virtual space on a computer is viewed from a viewpoint to project a 2D image of the 3D model on projection pixels of a plane of projection, and the viewpoint is defined for each projection pixel in such a manner as to the conditions of a camera used to take a picture to be combined with the 2D image. In other words, the directions of rays of light incident on pixels of an image plane of the camera are measured in advance and correlated to pixel positions in a frame of the picture taken by the camera, and lines of sight for tracing for use in projecting 'colors' of the 3D model on the projection pixels are each made conformable with a ray of light incident on the pixel of the image plane of the camera corresponding to the projection pixel.

To obtain the 'colors' of each projection pixel, a consideration may preferably be given to the attributes of the corresponding portions of the 3D model, which attributes may include color (hue, brightness, saturation, etc.), reflectance, transparency, distance from the viewpoint, and the like.

In the above method, the lines of sight may be defined based upon the directions and positions of the rays of light incident on the pixels of the picture corresponding to the projection pixels, and such directions and positions may be obtained by consulting a calibration table. More specifically, the above method may further include providing a calibration table having first data and second data correlated with each other, the first data concerning positions of pixels of the picture taken by the camera and the second data concerning directions and positions of rays of light incident on the pixels of the picture. Thus, the lines of sight may be defined based upon the directions and positions of the rays of incident light obtained by looking up the second data with the first data in the calibration table.

According to the methods for compositing images as defined above, a good agreement is achieved in optics between a picture taken from life by a camera in the real world and a 2D computer-graphics image created from a 3D model in a virtual space on a computer. Consequently, the resultant composite image can be rendered natural, so that a moving video picture made from such composite images can be free from awkward or artificial impression.

In another exemplary aspect of the present invention, there is provided an apparatus for compositing a CG image created by rendering a 3D model and a picture taken by a camera. The apparatus includes: (1) a calibration table storage unit for storing a calibration table having first data and second data correlated with each other, the first data concerning positions of pixels of the picture taken by the camera and the second data concerning directions and positions of rays of light incident on the pixels of the picture; (2) a line-of-sight calculation unit for obtaining lines of sight extending from a viewpoint to the 3D model, based upon the directions and positions of the rays of light incident on the pixels of the picture, obtained by looking up the second data with the first data in the calibration table, so that each of lines of sight passing through projection pixels on a plane of projection conforms with a ray of light incident on a pixel corresponding thereto of the picture taken by the camera; (3) a two-dimensional (2D) image generation unit for generating a 2D image on the plane of projection from the 3D model by tracing the lines of sight so as to obtain attributes of portions of the 3D model corresponding to the projection pixels on the plane of projection; and (4) a composite image generation unit for superposing the 2D image on the picture, to generate a composite image.

In the above apparatus, the calibration table is prepared beforehand, stored in the calibration storage unit and used in the line-of-sight calculation unit to obtain (calculate) the lines of sight for tracing, i.e., lines of sight for projecting a 3D model on the plane of projection. The calibration table may be a lookup table for retrieving information (as calibration data) on the direction and position of a specific incident light. Preferably, each piece of the second data (directions and positions) of the calibration table may include a direction in which a ray of light strikes on a pixel of the picture and a displacement from a base point to the incident light. Alternatively, for example, such one piece of the second data of the calibration table may include coordinates of two points on the incident light.

According to the apparatuses for compositing images as defined above, when the 2D image generation unit determines the colors (attributes) of the projection pixels from the relationship between the lines of sight for tracing and the 3D model, a 2D image having the same optical properties as of the picture taken from life by the camera in the real world can be generated from the 3D model. Consequently, the composite image generated in the composite image generation unit can be rendered natural, so that a moving video picture made from such composite images can be free from awkward or artificial impression.

Moreover, a program for compositing a CG image and a picture taken by a camera is provided as yet another exemplary aspect of the present invention. The program is capable of causing a computer to perform the steps of: (1) defining a 3D model, a viewpoint, and a plane of projection, in a space established on a computer; (2) defining lines of sight extending from the viewpoint to projection pixels on the plane of projection so that each of the lines of sight conforms with a ray of light incident on a pixel corresponding thereto of the picture taken by the camera; (3) tracing the lines of sight extending from the viewpoint through the plane of projection and the 3D model to obtain attributes of portions of the 3D model corresponding to the projection pixels, thereby forming a 2D image of the 3D model on the plane of projection; and (4) superposing the 2D image on the picture to generate a composite image.

In yet another exemplified aspect of the present invention, there is provided a method for rendering a 3D model created by CG into a 2D image to be superposed on a picture taken by a camera to form a composite image. The method includes: (1) defining a 3D model, a viewpoint, and a plane of projection, in a space established on a computer where the 2D model is located; (2) defining lines of sight extending from the viewpoint to projection pixels on the plane of projection so that each of the lines of sight conforms with a ray of light incident on a pixel corresponding thereto of the picture taken by the camera; (3) tracing the lines of sight extending from the viewpoint through the plane of projection and the 3D model to obtain attributes of portions of the 3D model corresponding to the projection pixels; and (4) setting the obtained attributes of the portions of the 3D model to the projection pixels corresponding thereto, to form a 2D image of the 3D model on the plane of projection.

In the above method, as discussed above in relation to the method for compositing images, the lines of sight may be defined based upon the directions and positions of the rays of light incident on the pixels of the picture corresponding to the projection pixels, and such directions and positions may be obtained by consulting a calibration table. More specifically, the above method may further include providing a calibration table having first data and second data correlated with each other, the first data concerning positions of pixels of the picture taken by the camera and the second data concerning directions and positions of rays of light incident on the pixels of the picture. Thus, the lines of sight may be defined based upon the directions and positions of the rays of incident light obtained by looking up the second data with the first data in the calibration table.

In yet another exemplified aspect of the present invention, there is provided an apparatus for rendering a 3D model created by computer graphics into a 2D image to be superposed on a picture taken by a camera to form a composite image. The apparatus includes: (1) a calibration table storage unit for storing a calibration table having first data and second data correlated with each other, the first data concerning positions of pixels of the picture taken by the camera and the second data concerning directions and positions of rays of light incident on the pixels of the picture; (2) a line-of-sight calculation unit for obtaining lines of sight extending from a viewpoint to the 3D model, based upon the directions and positions of the rays of light incident on the pixels of the picture, obtained by looking up the second data with the first data in the calibration table, so that each of lines of sight passing through projection pixels on a plane of projection conforms with a ray of light incident on a pixel corresponding thereto of the picture taken by the camera; and (3) a 2D image generation unit for generating the 2D image on the plane of projection from the 3D model by tracing the lines of sight so as to obtain attributes of portions of the 3D model corresponding to the projection pixels on the plane of projection.

In yet another exemplified aspect of the present invention, there is provided a program for rendering a 3D model created by CG into a 2D image to be superposed on a picture taken by a camera to form a composite image. The program is capable of causing a computer to perform the steps of: (1) defining a viewpoint, and a plane of projection, in a space established on a computer where the 3D model is located; (2) defining lines of sight extending from the viewpoint to projection pixels on the plane of projection so that each of the lines of sight conforms with a ray of light incident on a pixel corresponding thereto of the picture taken by the camera; (3) tracing the lines of sight extending from the viewpoint through the plane of projection and the 3D model to obtain attributes of portions of the 3D model corresponding to the projection pixels; and (4) setting the obtained attributes of the portions of the 3D model to the projection pixels corresponding thereto, to form a 2D image of the 3D model on the plane of projection.

Other advantages and further features of the present invention will become readily apparent from the following description of preferred embodiments with reference to accompanying drawings.

BRIEF DESCRIPTION OF THE DRAWINGS

FIG. 3 shows one example of a calibration table.

DETAILED DESCRIPTION OF THE PREFERRED EMBODIMENTS

A detailed description of exemplified embodiments of the present invention will be given with reference to the drawings. First, the optical property of the real-world ("non-pinhole") camera will be described in which rays of incident light do not travel through a single point and thus such distortion in images as could appear in the pinhole camera is eliminated. Next described is calibration data that represents the optical property of the non-pinhole camera in numerical form. Subsequent descriptions will give an idea of a calibration table which includes such calibration data, and illustrate a method of acquiring the calibration data for each pixel of an image taken by a camera to generate the calibration table. Further, a description will be given of apparatuses for compositing images and for rendering an image, which utilizes the calibration table, as exemplary embodiments of the present invention.

[Optical Property of Non-Pinhole Camera]

Figure 7:
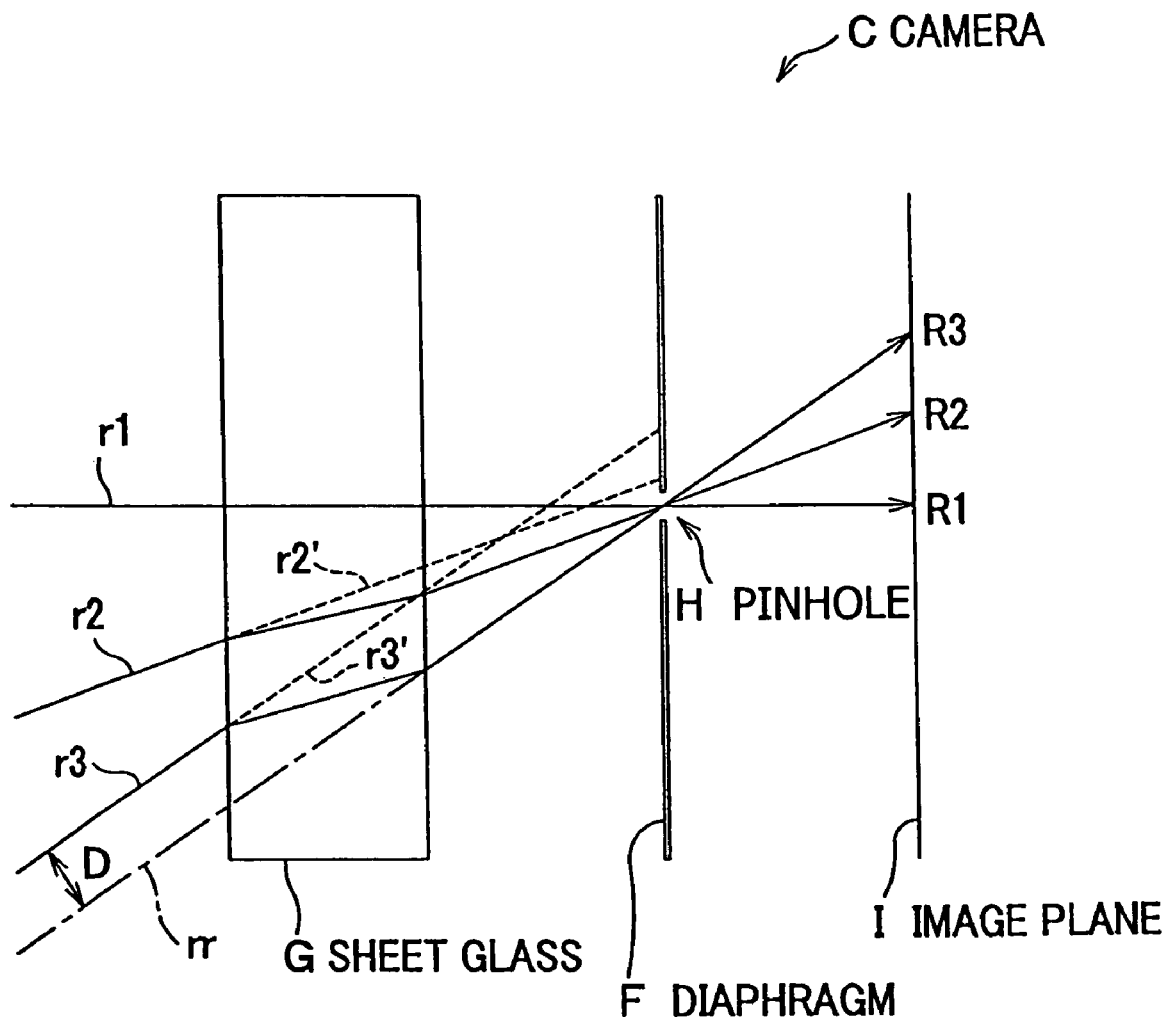
FIG. 7 is a schematic diagram of a camera having a lens system.

Referring now to FIG. 7, the mechanism of distortion of a picture taken by a non-pinhole camera having a lens system will come up for discussion. FIG. 7 is a schematic diagram of a camera C having a lens system. Assume for the sake of simplicity that sheet glass G is provided as a lens system and a pinhole H is provided as an aperture formed by a diaphragm F of the camera C. A ray of incident light r1 that strikes perpendicularly on the sheet glass G travels through the pinhole H and reaches a pixel R1 on an image plane I. In contrast, rays of incident light r2, r3 that strike obliquely on the sheet glass G are refracted, and then travel through the pinhole H and reach pixels R2, R3, respectively, on the image plane I.

It is however noted that the rays of incident light r2, r3, would be straight as indicated by r2' and r3', respectively, and may not touch the pinhole H as shown in FIG. 7, and unless refracted by the sheet glass G, would not be concurrent with (extend but not intersect at one and the same point with) the ray of incident light r1, and it is thus understood that the situation in actuality is different from that which the pinhole camera model is premised on. Consequently, although a ray of incident light rr would assumedly strike on the pixel R3 on the image plane I according to the pinhole camera model, the ray of incident light r3 that is shifted by a distance D from the ray of incident light rr instead strikes on the pixel R3 on the image plane I.

From the foregoing, it has been shown that the camera having a lens system (e.g., sheet glass G) transmitting rays of incident light fails to exhibit the optical property of the pinhole camera (rather exhibits the optical property of the non-pinhole camera).

[Calibration Data]

Figure 8:
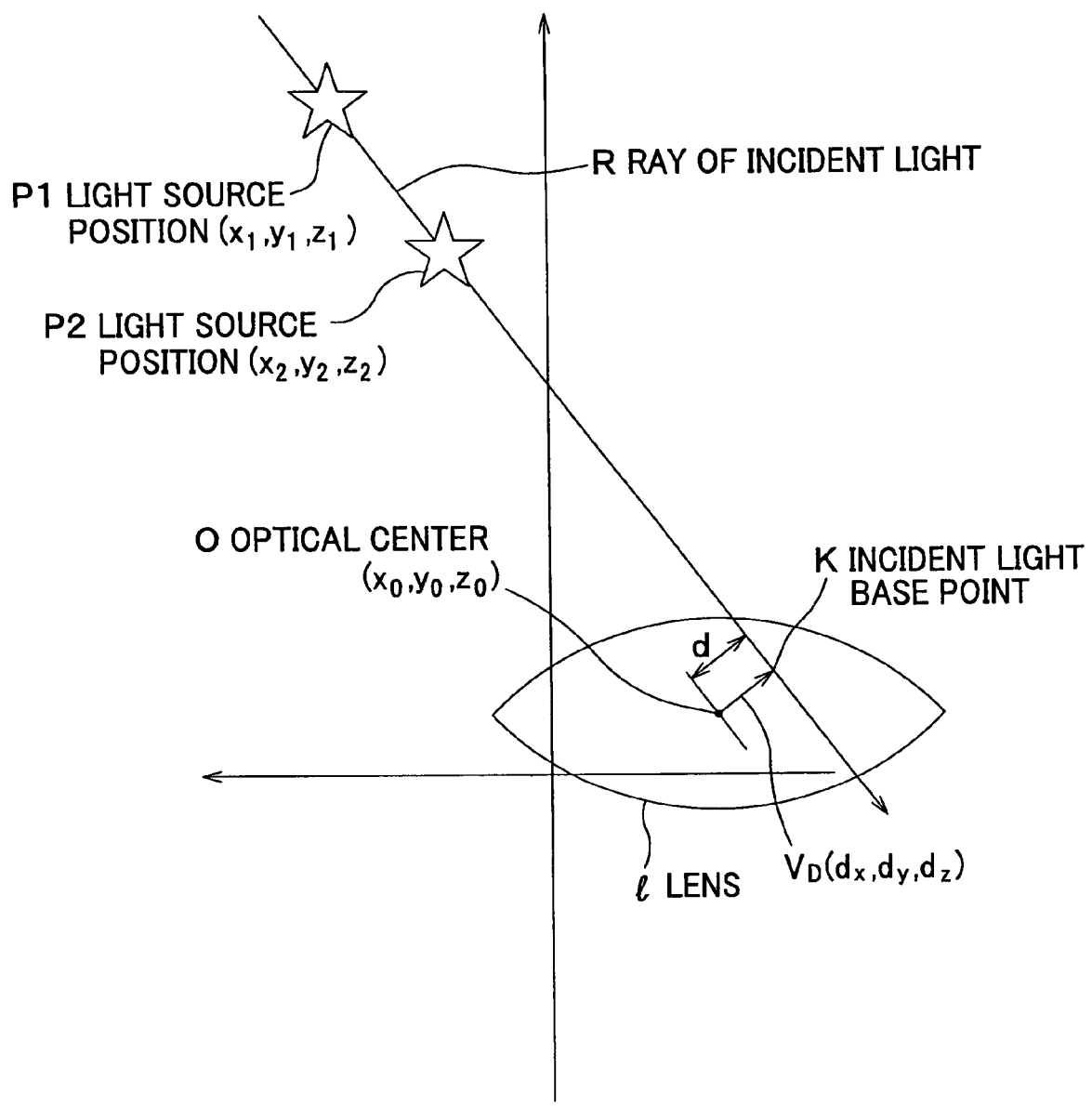
FIG. 8 is a diagram for explaining calibration data.

Turning to FIG. 8, calibration data that represents the optical property of the non-pinhole camera in numerical form will be discussed hereinafter.

FIG. 8 is a diagram for explaining calibration data. As shown in FIG. 8, a ray of light R incident on a lens (optical element) l can be determined by two points. Hereupon, if rays of light originating from a first light source position P1 and a second light source position P2 strike on one and the same pixel (not shown), the ray of incident light R is determined as a ray of light incident on that particular pixel.

By definition, an optical center O of an optical element l is a point from which the sum of the squares of distances to all rays of light incident on the optical element l is a minimum; an incident light base point K of a ray of light R incident on each pixel is a point on the ray of incident light R from which the distance to the optical center O is a minimum.

To be more specific, the optical center $(x_o, y_o, z_o)$ is determined by least-squares method in which the squares of distances d (as expressed by the following equation (1)) from the optical center O to all the rays of incident light R are summed up to fit a point exhibiting the minimum among the sums to the optical center O, where each ray of incident light R is defined by light source position P1 $(x_1, y_1, z_1)$ and light source position P2 $(x_2, y_2, z_2)$.

$$d^2 = (A^2/B) + C \qquad (1)$$

where $A = (x_2 - x_1)(x_1 - x_0) + (y_2 - y_1)(y_1 - y_0) + (z_2 - z_1)(z_1 - z_0)$;
$B = (x_2 - x_1)^2 + (y_2 - y_1)^2 + (z_2 - z_1)^2$; and
$C = (x_1 - x_0)^2 + (y_1 - y_0)^2 + (z_1 - z_0)^2$ Utilizing the above-defined concepts of the optical center O and the incident light base point K, the position of a ray of incident light R may be defined as a displacement from the optical center O to the incident light base point K. Accordingly, the direction of a ray of incident light (as defined by light source position P1 and light source position P2) and the displacement from the optical center O to the incident light base point K (as defined by three-dimensional vector $V_D (d_x, d_y, d_z)$) are correlated with each other for each pixel on which the ray of incident light strike, so that such correlated data may be used as calibration data representing the optical property of the non-pinhole camera in numerical form relative to that of the pinhole camera, to correct the direction and position of the ray of light R traveling through the optical element l and striking on the corresponding pixel of the image plane I.

It is to be understood that the calibration data is not limited to the above, but any data representing the directions and positions of rays of incident light may be used. For example, the calibration data concerning the position of a ray of incident light is indicated by the displacement (three-dimensional vector) from the optical center O of the optical element l to a foot of a perpendicular extending to the ray of incident light R in the above embodiment, but the base point for determining the displacement may be any point other than the optical center O as long as the point is in a fixed position relative to the camera. Moreover, the displacement $V_D$ may be determined as any vector from the base point to any one point on the ray of incident light, other than the point defined as the foot of a perpendicular extending to the ray of incident light.

[Methods for Generating Calibration Table]

Figure 9B:
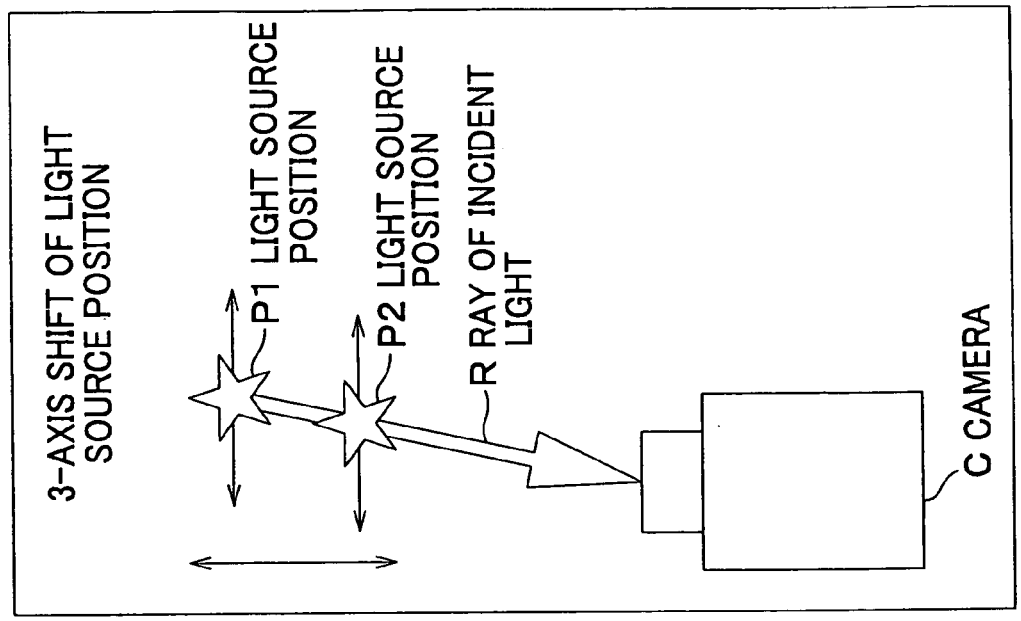
FIG. 9B is a diagram for explaining another process for generating calibration data, in which a camera is fixed while a beam of incident light is varied.
Figure 9A:
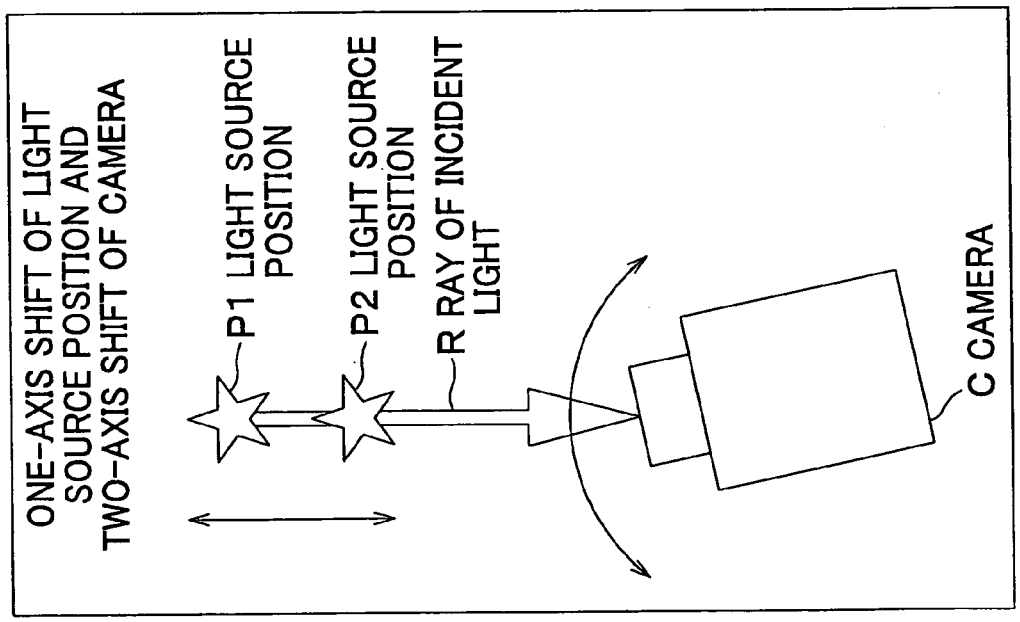
FIG. 9A is a diagram for explaining a process for generating calibration data, in which a beam of incident light is fixed while pan and tilt of a camera are varied.

Turning to FIGS. 9A and 9B, a description will be given of a process (method) for generating a calibration table in which calibration data representing in a numerical form the optical property of a non-pinhole camera for each pixel of an image taken by the non-pinhole camera are stored in a correlated manner. FIG. 9A illustrates a conceptual diagram for explaining one exemplary method for acquiring calibration data, in which a ray of incident light is fixed while pan and tilt of a camera are varied. FIG. 9B illustrates a conceptual diagram for explaining another exemplary method for acquiring calibration data, in which a camera is fixed while a ray of incident light is varied.

As shown in FIG. 9A, to generate a calibration table in which calibration data are correlated with each other for each pixel of an image taken by the "non-pinhole" camera C, the light source position is shifted from P1 to P2 or from P2 to P1 (one-axis shift) with respect to the non-pinhole camera C to determine a ray of incident light R as defined by two light source points P1 and P2, and the pan and tilt of the camera C are varied (two-axis shift) so that rays of light originating from both of the light source position P1 and the light source position P2 strike on a specific pixel to be measured. In this way, the direction of the ray of light R incident on each pixel of the image plane I in the camera C is determined.

Alternatively, as shown in FIG. 9B, the light source position P1 and the light source position P2 may be shifted in three directions X, Y and Z (three-axis shift) while the camera C is fixed in position so that rays of light originating from both of the light source position P1 and the light source position P2 strike on a specific pixel to be measured. In this way, the direction of a ray of light R incident on each pixel of the image plane I in the camera C as defined by two light source points P1 and P2 may be determined.

Based upon the rays of incident light R determined for each pixel on the image plane I, the direction of the ray of incident light R and the displacement thereof from the optical center O to the incident light base point K (see FIG. 8) are correlated and listed as calibration data for each projection pixel on the plane of projection pixel to form a calibration table.

Since the calibration table is designed to determine the direction and position of a ray of incident light corresponding to each pixel relative to a base position in a camera, the calibration table may be formed in a different manner; for example, the direction and position of the ray of incident light may be determined by coordinates of two points on the incident light, and thus the calibration data looked up in the calibration table may be the coordinates of two points on the incident light.

[Apparatus for Compositing Images]

Figure 1:
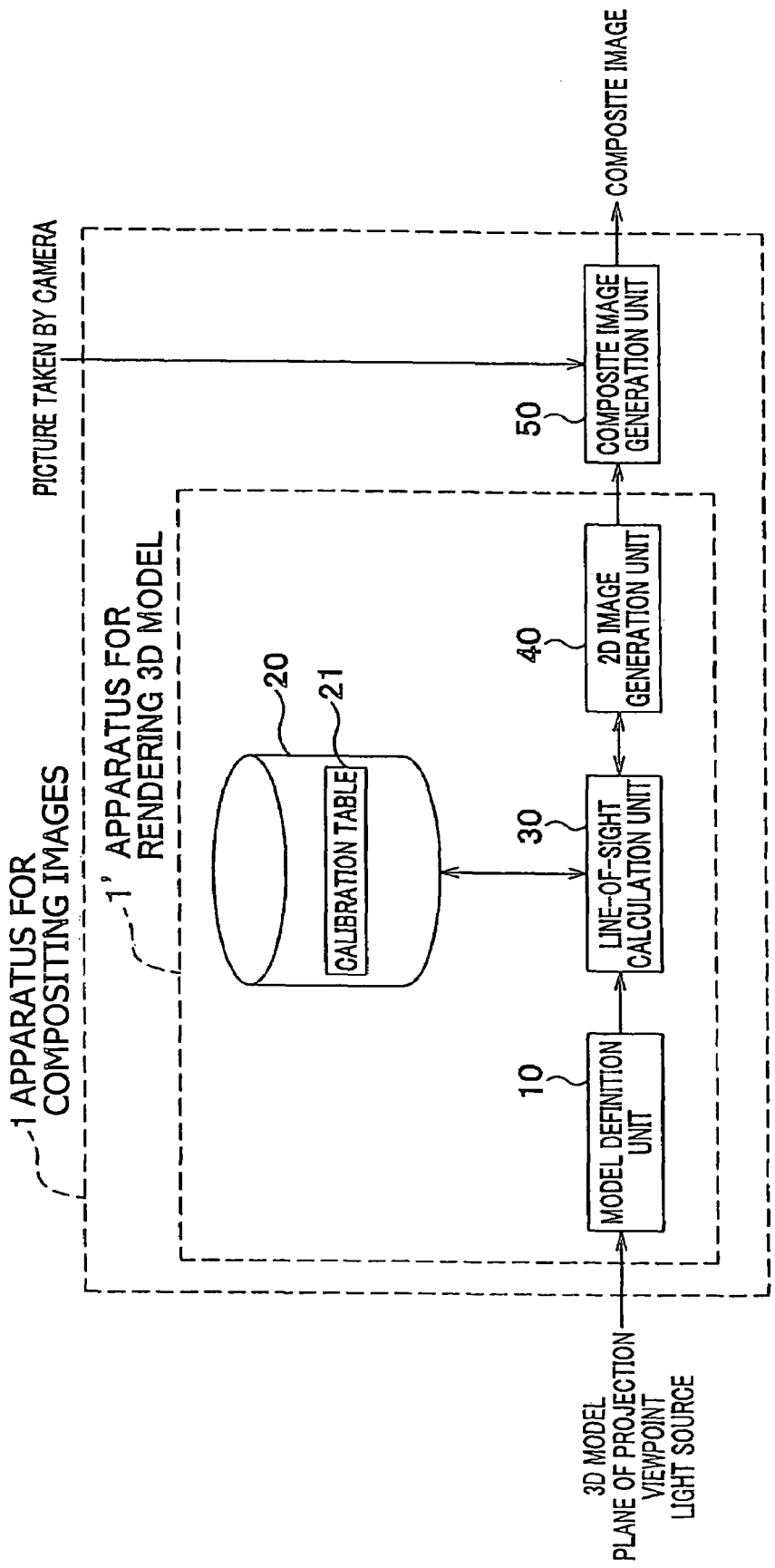
FIG. 1 is a block diagram of an apparatus for compositing images according to one exemplary embodiment of the present invention.
Figure 2:
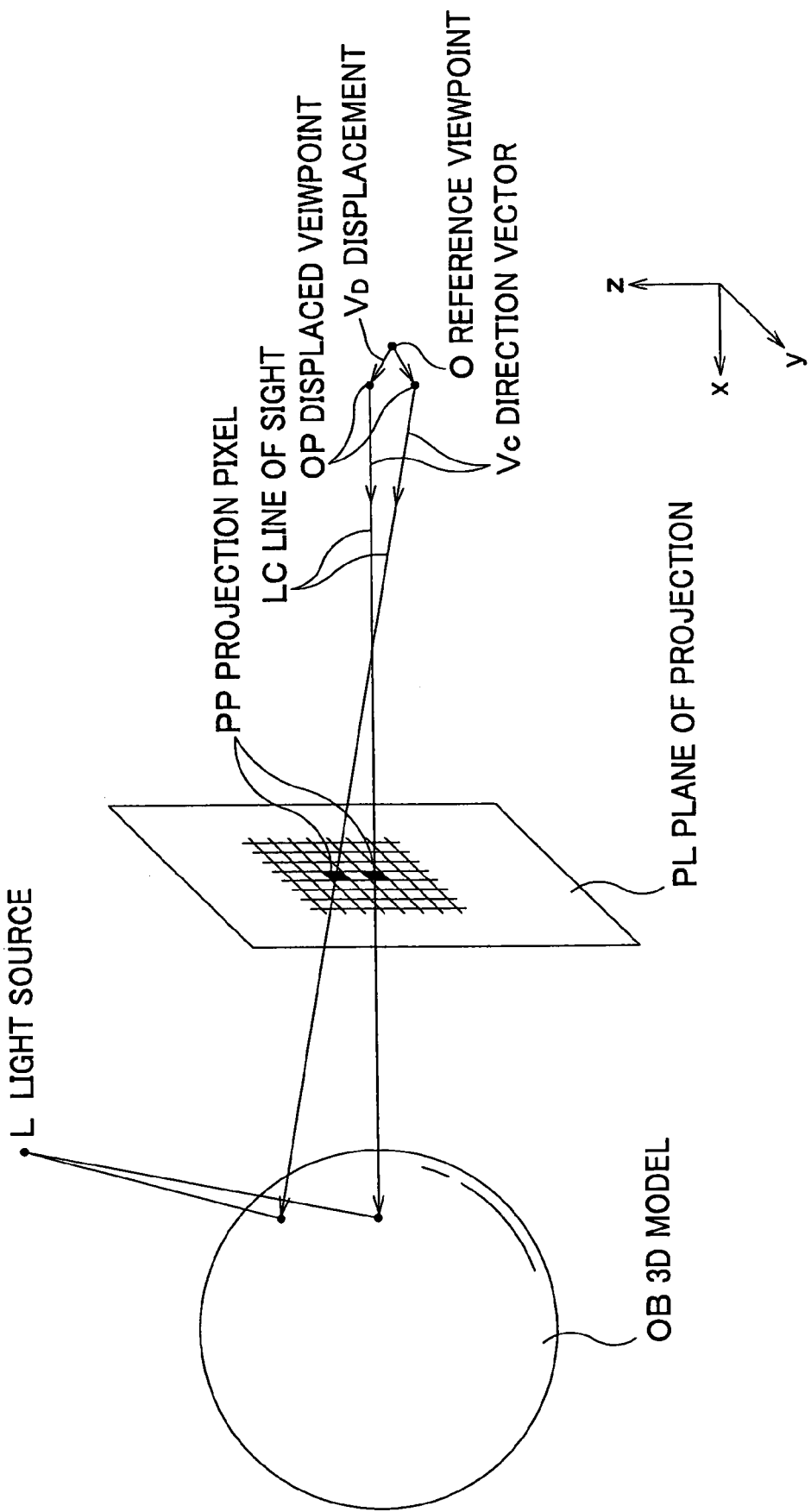
FIG. 2 is a diagram for illustrating a rendering process for use in the apparatus as shown in FIG. 1.

Next, an apparatus for compositing images according to one embodiment of the present invention will be discussed in detail with reference to FIGS. 1 and 2. FIG. 1 illustrates a system configuration of the apparatus for compositing images, and FIG. 2 illustrates a rendering process for use in the apparatus as shown in FIG. 1. The apparatus 1 of FIG. 1 is an apparatus for compositing a computer-graphics (CG) image created by rendering a three-dimensional (3D) model and a picture taken by a camera (not shown).

As shown in FIG. 1, the apparatus 1 includes a model definition unit 10, a calibration table storage unit 20, a line-of-sight calculation unit 30, a two-dimensional (2D) image generation unit 40, and a composite image generation unit 50. Among the elements of the apparatus 1 for compositing images, those elements other than the composite image generation unit 50 constitute an apparatus 1' for rendering a 3D model, that is to say, the apparatus 1' includes a model definition unit 10, a calibration table storage unit 20, a line-of-sight calculation unit 30, and a 2D image generation unit 40.

Each of those elements may be implemented as a program module (or code) which operates in concert with each other to cause a computer to perform specific process steps. The computer typically includes a processor or central processing unit (CPU), a memory or storage, such as a RAM, a ROM and an external storage, an input/output device such as a keyboard, a mouse, a pen, a stylus, a scanner, an optical character recognition, a display and a printer, and a communication or network interface from/to which data or commands are transmitted, and achieves a variety of functionality including a digital image processing with a set of instructions given in the form of a computer program. In other words, the apparatuses 1 and 1' may be embodied as a program (computer program), so that they may be distributed in the form of a program product (software package) stored on a disk or other storage medium, or via network or other communications medium to a user who may install the program on his/her local computer or network system for the purpose of compositing images or of rendering a 3D model.

The model definition unit 10 is designed to define a 3D model OB, a plane of projection PL, a reference viewpoint O, the position of a light source L, the position and orientation of the model, in space coordinates established in the apparatus 1 (or a memory of a computer). Specifically, the model definition unit 10 provides an interface through which a user may input data concerning the 3D model OB and surrounding conditions thereof in which the 3D model is located and rendered into a 2D (bitmapped) image. Each value of the data is determined in accordance with conditions in which a picture (such as a background image) taken from life and to be combined with a CG image is taken by a camera. For example, the tilt angle of the camera relative to the ground, the position of the light source L relative to the camera, and the like are set or entered.

The 3D model OB may be created by a 3D CAD, etc., or generated based upon actually measured values, in a virtual space (i.e., memory) of a computer, and thus a user may input various parameters through the input device of his/her terminal, or import the data from the outside of the apparatus 1 or 1', or load a set of data from a storage unit (not shown) of the apparatus 1 or 1', in order to define the 3D model OB.

The plane of projection PL is a plane which is located in the virtual space of the computer and on which a view of the 3D model OB seen from the reference viewpoint O is projected. The plane of projection PL and the reference viewpoint O are defined so that all the lines of sight pass through the plane of projection PL. The projection pixels PP defined on the plane of projection PL are determined to be at positions corresponding to the positions through which lines of sight generated for pixels of a picture taken by the camera. The frame of the projection pixels PP is defined in accordance with the angle (angular field) of view of the camera.

The reference viewpoint O is located at a starting point for projecting the 3D model OB on the plane of projection PL. To be more specific, from the reference viewpoint O toward the projection pixels PP, lines of sight LC for tracing are extended to obtain the color of the 3D model OB. The starting point of the lines of sight LC for tracing is not precisely identical with the reference viewpoint O, as will be described later, and thus a displaced viewpoint OP is used in actuality. The displaced viewpoint OP is obtained by shifting the starting position from the reference viewpoint O by a displacement $V_D$ (quantity of three-dimensional vector represented by direction and amount). It is to be understood that the term "viewpoint" according to the present invention as set forth in the above summary of the invention and in the appended claims include the reference viewpoint O and the displaced viewpoint OP.

The light source L is an imaginary source of light in a virtual space created on a computer, and is defined in accordance with the conditions exhibited when the picture is taken by the camera. For example, when the picture is taken by the camera outside, the brightness, color, position and the like of the light source L are determined in accordance with the position of the sun. The number of light sources is not limited to one; rather, depending upon the conditions in which the picture is taken by the camera, a plurality of light sources L may preferably be provided.

The calibration table storage unit 20 is a storage unit (e.g., a hard disk drive) in which is stored a calibration table 21 for use in determining the lines of sight LC for tracing. The calibration table 21 contains a list of correlated values of: for each position of a pixel as represented by coordinates (x, y) on the plane of projection PL, (1) a displacement $V_D$ (dx, dy, dz) of the displaced viewpoint OP from the reference viewpoint O; and (2) a direction vector $V_C$ (Cx, Cy, Cz).

The displacement $V_D$ is a three-dimensional vector from the reference viewpoint O to the displaced viewpoint OP. The reference viewpoint O may be any fixed point in the virtual space of the computer, but may preferably be defined as a point corresponding to an optical center of the camera for convenience' sake. The endpoint of the displacement $V_D$ may be any definite point on the line of sight corresponding to a specific ray of light incident on the camera, and may preferably be defined as a point corresponding to the foot of a line perpendicular to the ray of incident light.

The direction vector $V_C$ is a three-dimensional vector from the displaced viewpoint OP toward the projection pixel PP.

Consequently, the reference viewpoint O, displacement VD and direction vector $V_C$ as thus defined may be used to determine a specific line of sight LC for tracing. Data to be stored in the calibration table for use in determining the line of sight LC for tracing is not limited to the above, and any data usable to determine the directions and positions of the rays of incident light corresponding to the lines of sight LC can be employed, instead.

The line-of-sight calculation unit 30 is a means for obtaining each of the lines of sight LC based upon the displacement $V_D$ and direction vector $V_C$ corresponding to the position of the projection pixel PP, retrieved from the calibration table 21 stored in the calibration table storage unit 20. Specifically, the displacement $V_D$ is added to the coordinates of the reference viewpoint O to obtain the coordinates of the displaced viewpoint OP, and the line of sight LC is calculated from the coordinates of the displaced viewpoint OP and the direction vector $V_C$.

The 2D image generation unit 40 is a means for obtaining the color (attributes) of portions of the 3D model to determine the corresponding color (attributes) of the projection pixels PP. Specifically, the lines of sight LC are traced from the displaced viewpoint OP to the 3D model OB to obtain the data (e.g., color, reflectance, etc.) on the surface of the 3D model, and are further traced to the light source L to determine information on the 3D model including the color of the projection pixels PP (e.g., brightness, hue and distance from reference viewpoint O). If the 3D model has a transparent body, the lines of sight LC is extended and traced into the 3D model OB to determine the color thereof. The distance from the reference viewpoint O may preferably be acquired and stored because it may be required upon composition of the resultant CG image and the picture taken by the camera.

Using the color (attributes) of every projection pixel PP determined as described above, a two-dimensional image is generated on the plane of projection PL.

The composite image generation unit 50 is a means for compositing two images: one is formed by the 2D image generation unit 40 and the other is derived from the picture taken by the camera. The picture may be input through an appropriate input device (e.g., a scanner) or transmitted through a communication means (via a local area network, wide area network or the Internet, public or private, wired or wireless, etc.) from an external source. Alternatively, the pictures may be stored in advance in a storage unit incorporated in the apparatus 1, and retrieved from the storage when needed. Composite image is basically formed by superposing the 2D image on the picture taken by the camera in accordance with the distance from the reference viewpoint O. In other words, the colors (attributes) of the pixels of the picture corresponding to an area of the scene in which the 3D object should appear frontward, thus covering that area, are replaced with the colors (attributes) of the pixels of the 2D image of the 3D object.

When the dimensions of the image frames have not been adjusted up to that stage, the image frames adjustment operation should precede the superposing operation.

Figure 4:
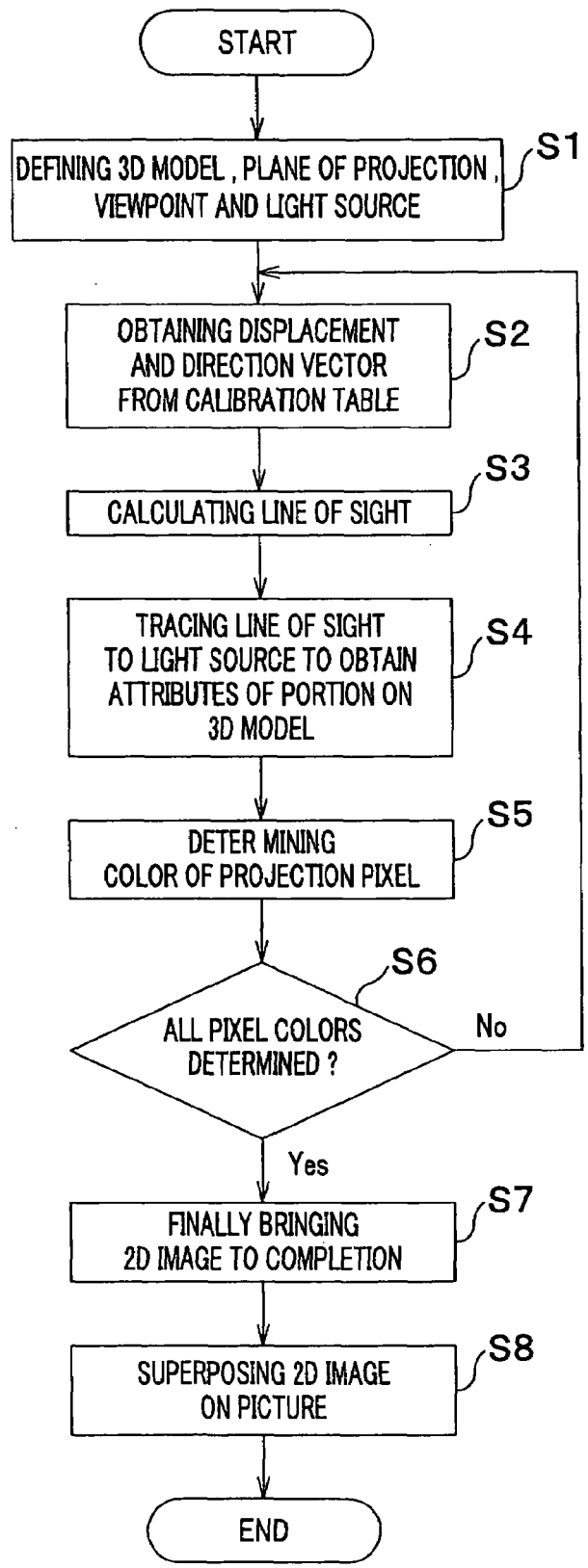
FIG. 4 is a flowchart of an exemplary process performed by the apparatus as shown in FIG. 1.
Figure 5:
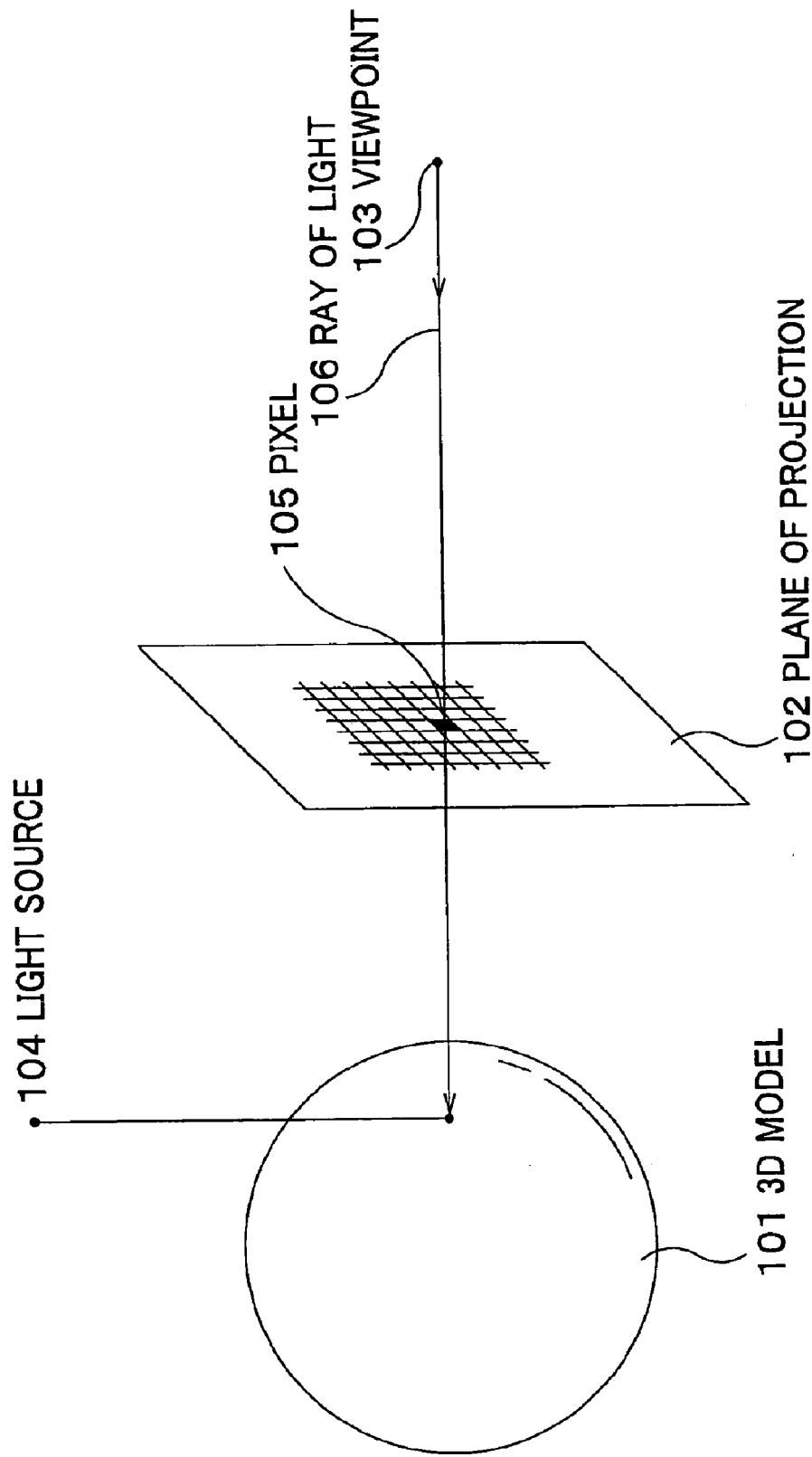
FIG. 5 is a diagram for explaining a general concept of ray tracing.
Figure 6:
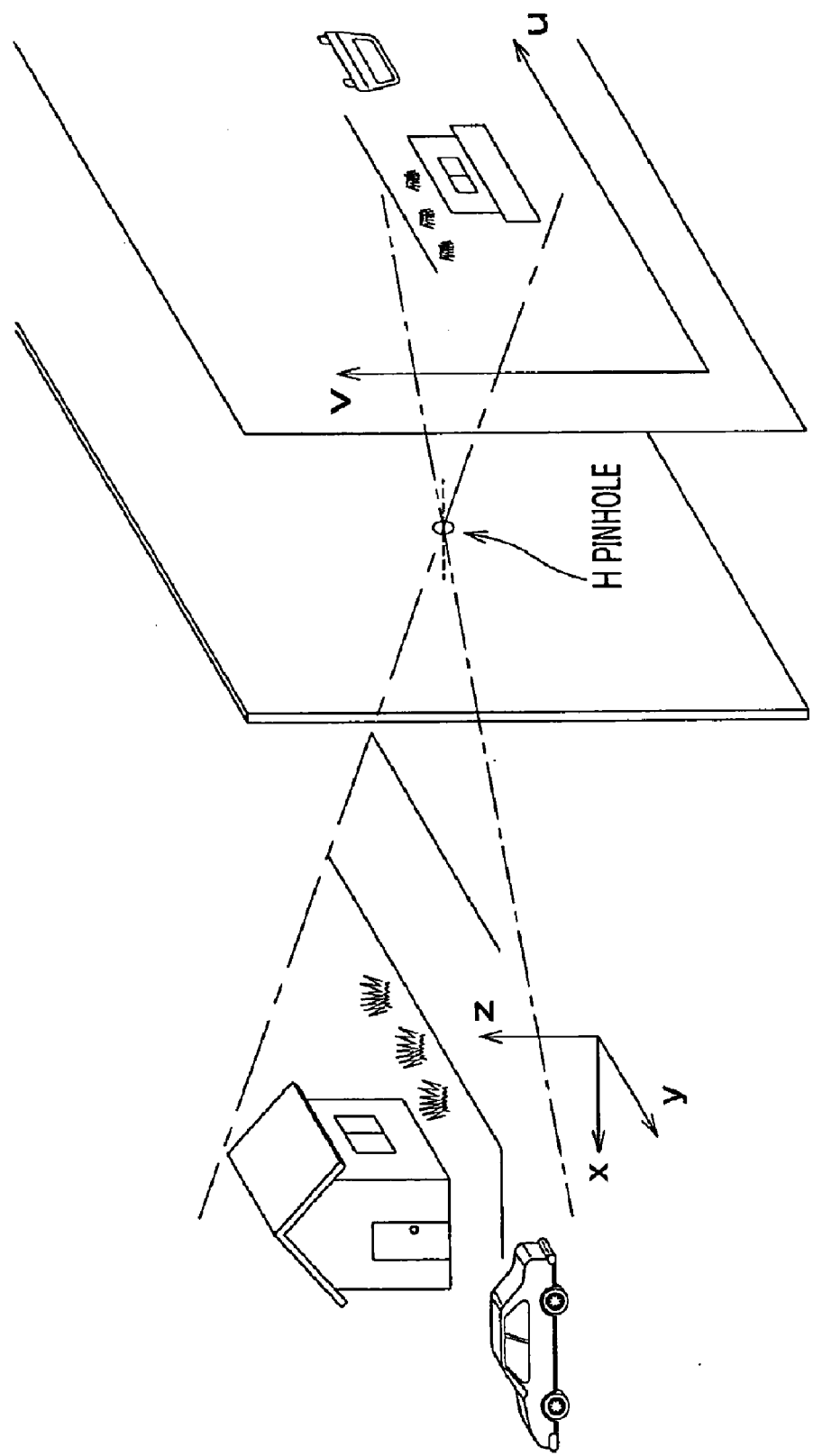
FIG. 6 is a diagram for explaining a general concept of pinhole camera model.

Next, the operation of the apparatus 1 and 1' (for rendering a 3D model and compositing images) will be described with reference to a flowchart of FIG. 4.

First of all, the model definition unit 10 defines a three-dimensional model OB, a plane of projection PL, projection pixels PP and a frame thereof, a reference viewpoint O, and a light source L (step S1). To be more specific, a set of data for the 3D model OB and a position thereof in the virtual space of the computer is determined. Further, the reference viewpoint O is set at a position corresponding to the position of the camera at the time of taking the picture; the plane of projection PL and the projection pixels PP thereon are set at a position corresponding to the image plane of the camera; and the light source L, reference viewpoint O, plane of projection PL and projection pixels PP are appropriately located so as to conform with the conditions represented when the picture is taken by the camera.

The calibration table 21 is then consulted to obtain the displacement $V_D$ and direction vector $V_C$ corresponding to the projection pixel PP (step S2).

Next, the line-of-sight calculation unit 30 calculates the line of sight LC for tracing based upon the displacement $V_D$ and the direction vector $V_C$ (step S3).

Once the line of sight LC is calculated, the 2D image generation unit 40 traces the line of sight LC from the displaced viewpoint OP to the light source L, to obtain the attributes (e.g., the color on the surface or inside, reflectance, transparency, etc.) of the 3D model OB (step S4), and determining the color of the projection pixel PP (step S5).

At this stage, it is determined in step S6 whether the colors of all the projection pixels PP are determined, and if it is determined not (No in step S6), the process steps S2 through S5 are repeated until it is determined so (Yes in step S6). Completion of the pixel color determination for all the projection pixels PP (Yes in step S6) finally brings the 2D image to completion (step S7).

Lastly, the resultant 2D image is superposed on the picture taken by the camera (step S8), and a composite image is obtained.

The apparatus 1 for compositing images and apparatus 1' for rendering a 3D image according to the above-described embodiment of the present invention can project the 3D model on the plane of projection with lines of sight traced along such a course as is the case of rays of light incident on the camera. Accordingly, when the 2D image generated on the plane of projection is superposed on the picture taken from life by the camera to form a composite image, the 2D image (CG) is subject to composition with the picture in such a conformable manner that a position and orientation thereof can exactly be fit for the picture. Therefore, the use of the inventive apparatus 1 for compositing images (and apparatus 1' for rendering a 3D image) in compositing a CG and a picture taken by a camera to form each frame of a moving video picture facilitates production of a natural composite moving video picture in which pictures taken from life and artificial CG images coexist without awkwardness.

Although the preferred embodiments of the present invention have been described above, various modifications and changes may be made in the present invention without departing from the spirit and scope thereof.

As discussed above, with the method, apparatus and program for compositing image according to the present invention used in various forms and applications, the displacement of a ray of light incident on the lens system of a camera with respect to the optical center, which would otherwise occur in rendering a 3D model, can be corrected or calibrated with consideration given to the non-pinhole camera-specific optical property of the real-world camera, whereby a natural composite image without awkward impression can be obtained from a picture taken from life by the camera and a CG image.

With the method, apparatus and program for rendering 3D model according to the present invention used in various forms and applications, a 2D image to be combined with a picture taken from life by a camera can be generated with great ease and accuracy.

What is claimed is:

1. A method for compositing a computer-graphics image and a picture taken by a camera comprising:

defining, in accordance with conditions in which the picture is taken, a three-dimensional model, a viewpoint, and a plane of projection, in a space established on a computer, the conditions comprising at least one of the tilt angle of the camera relative to a ground surface and the position of a light source relative to the camera;

defining lines of sight extending from the viewpoint to projection pixels on the plane of projection so that each of the lines of sight conforms with a ray of light incident on a pixel corresponding thereto of the picture taken by the camera;

tracing the lines of sight extending from the viewpoint through the plane of projection and the three-dimensional model to obtain attributes of portions of the three-dimensional model corresponding to the projection pixels, thereby forming a two-dimensional image of the three-dimensional model on the plane of projection; and superposing the two-dimensional image on the picture to generate a composite image;

wherein said step of defining lines of sight involves providing a calibration table having first data and second data correlated with each other, the first data comprising positions of pixels of the picture taken by the camera and the second data comprising calibration data corresponding to directions and positions of rays of light incident on the pixels of the picture, wherein the lines of sight are obtained by looking up the second data by the first data in the calibration table.

2. An apparatus for compositing a computer-graphics image created by rendering a three-dimensional model and a picture taken by a camera, comprising:

a calibration table storage unit for storing a calibration table having first data and second data correlated with each other, the first data comprising positions of pixels of the picture taken by the camera and the second data comprising directions and positions of rays of light incident on the pixels of the picture corresponding to optical properties of the camera;

a line-of-sight calculation unit for obtaining lines of sight extending from a viewpoint to the three-dimensional model, based upon the directions and positions of the rays of light incident on the pixels of the picture, obtained by looking up the second data with the first data in the calibration table, so that each of lines of sight passing through projection pixels on a plane of projection conforms with a ray of light incident on a pixel corresponding thereto of the picture taken by the camera;

a two-dimensional image generation unit for generating a two-dimensional image on the plane of projection from the three-dimensional model by tracing the lines of sight so as to obtain attributes of portions of the three-dimensional model corresponding to the projection pixels on the plane of projection; and a composite image generation unit for superposing the two-dimensional image on the picture, to generate a composite image.

3. The apparatus of claim 2, wherein each piece of the second data of the calibration table includes a direction in which a ray of light strikes on a pixel of the picture and a displacement from a base point to the incident light.

4. The apparatus of claim 2, wherein one piece of the second data of the calibration table includes coordinates of two points on the incident light.

5. A program embodied on a computer readable medium for compositing a computer-graphics image and a picture taken by a camera, the program causing a computer to perform the steps of:

defining, in accordance with conditions in which the picture is taken, a three-dimensional model, a viewpoint, and a plane of projection, in a space established on a computer, the conditions comprising at least one of the tilt angle of the camera relative to a ground surface and the position of a light source relative to the camera;

defining lines of sight extending from the viewpoint to projection pixels on the plane of projection so that each of the lines of sight conforms with a ray of light incident on a pixel corresponding thereto of the picture taken by the camera;

tracing the lines of sight extending from the viewpoint through the plane of projection and the three-dimensional model to obtain attributes of portions of the three-dimensional model corresponding to the projection pixels, thereby forming a two-dimensional image of the three-dimensional model on the plane of projection; and superposing the two-dimensional image on the picture to generate a composite image;

wherein the step of defining lines of sight involves providing a calibration table having first data and second data correlated with each other, the first data comprising positions of pixels of the picture taken by the camera and the second data comprising calibration data corresponding to directions and positions of rays of light incident on the pixels of the picture, wherein the lines of sight are obtained by looking up the second data by the first data in the calibration table.

6. A method for rendering a three-dimensional model created by computer graphics into a two-dimensional image to be superposed on a picture taken by a camera to form a composite image, the method comprising:

defining a viewpoint, and a plane of projection, in a space established on a computer where the three-dimensional model is located in accordance with the conditions in which the picture is taken, the conditions comprising at least one of the tilt angle of the camera relative to a ground surface and the position of a light source relative to the camera;

defining lines of sight extending from the viewpoint to projection pixels on the plane of projection so that each of the lines of sight conforms with a ray of light incident on a pixel corresponding thereto of the picture taken by the camera;

tracing the lines of sight extending from the viewpoint through the plane of projection and the three-dimensional model to obtain attributes of portions of the three-dimensional model corresponding to the projection pixels; and setting the obtained attributes of the portions of the three-dimensional model to the projection pixels corresponding thereto, to form a two-dimensional image of the three-dimensional model on the plane of projection;

wherein said step of defining lines of sight involves providing a calibration table having first data and second data correlated with each other, the first data comprising positions of pixels of the picture taken by the camera and the second data comprising calibration data corresponding to directions and positions of rays of light incident on the pixels of the picture, wherein the lines of sight are obtained by looking up the second data by the first data in the calibration table.

7. An apparatus for rendering a three-dimensional model created by computer graphics into a two-dimensional image to be superposed on a picture taken by a camera to form a composite image, the apparatus comprising:

a calibration table storage unit for storing a calibration table having first data and second data correlated with each other, the first data comprising positions of pixels of the picture taken by the camera and the second data comprising directions and positions of rays of light incident on the pixels of the picture corresponding to optical properties of the camera;

a line-of-sight calculation unit for obtaining lines of sight extending from a viewpoint to the three-dimensional model, based upon the directions and positions of the rays of light incident on the pixels of the picture, obtained by looking up the second data with the first data in the calibration table, so that each of lines of sight passing through projection pixels on a plane of projection conforms with a ray of light incident on a pixel corresponding thereto of the picture taken by the camera; and a two-dimensional image generation unit for generating the two-dimensional image on the plane of projection from the three-dimensional model by tracing the lines of sight so as to obtain attributes of portions of the three-dimensional model corresponding to the projection pixels on the plane of projection.

8. A program embodied on a computer readable medium for rendering a three-dimensional model created by computer graphics into a two-dimensional image to be superposed on a picture taken by a camera to form a composite image, the program causing a computer to perform the steps of:

defining a viewpoint, and a plane of projection, in a space established on a computer where the three-dimensional model is located in accordance with the conditions in which the picture is taken, the conditions comprising at least one of the tilt angle of the camera relative to a ground surface and the position of a light source relative to the camera;

defining lines of sight extending from the viewpoint to projection pixels on the plane of projection so that each of the lines of sight conforms with a ray of light incident on a pixel corresponding thereto of the picture taken by the camera;

tracing the lines of sight extending from the viewpoint through the plane of projection and the three-dimensional model to obtain attributes of portions of the three-dimensional model corresponding to the projection pixels; and setting the obtained attributes of the portions of the three-dimensional model to the projection pixels corresponding thereto, to form a two-dimensional image of the three-dimensional model on the plane of projection;

wherein said step of defining lines of sight involves providing a calibration table having first data and second data correlated with each other, the first data comprising positions of pixels of the picture taken by the camera and the second data comprising calibration data corresponding to directions and positions of rays of light incident on the pixels of the picture, wherein the lines of sight are obtained by looking up the second data by the first data in the calibration table.

9. The method for compositing a computer-graphics image and a picture taken by a camera according to claim 1, further comprising the method step of defining each line of sight extending from the view point to the projection pixels using a displacement vector comprising a 3-D vector representing displacement from the viewpoint to a displaced viewpoint, a direction vector comprising a 3-D vector representing direction from the displaced viewpoint toward the projection pixel, wherein the displaced viewpoint is obtained by shifting a starting position of a corresponding line of sight from the viewpoint of the corresponding line of sight by a displacement amount corresponding to the displacement vector, and wherein the line of sight for a given projection pixel is determined using the viewpoint, the displacement vector, and the direction vector.

10. The program embodied on a computer readable medium for compositing a computer-graphics image and a picture taken by a camera according to claim 5, further comprising the method step of defining each line of sight extending from the view point to the projection pixels using a displacement vector comprising a 3-D vector representing displacement from the viewpoint to a displaced viewpoint, a direction vector comprising a 3-D vector representing direction from the displaced viewpoint toward the projection pixel, wherein the displaced viewpoint is obtained by shifting a starting position of a corresponding line of sight from the viewpoint of the corresponding line of sight by a displacement amount corresponding to the displacement vector, and wherein the line of sight to a projection pixel is determined using the viewpoint, the displacement vector, and the direction vector.

11. The apparatus for compositing a computer-graphics image created by rendering a three-dimensional model and a picture taken by a camera according to claim 2, wherein the second data comprises a displacement vector representing the displacement of a displacement viewpoint relative to the viewpoint, and a direction vector representing a direction of the line of sight from the displacement viewpoint to the projection pixel.

* * * * *